US012735772B2

(12) United States Patent
Xing et al.

(10) Patent No.: US 12,735,772 B2
(45) Date of Patent: Sep. 15, 2026

(54) ALUMINUM ALLOY EXPANDED MATERIAL FOR WELDING USE, ALUMINUM ALLOY WELDING-JOINED BODY, AND METHOD FOR WELDING SAME

(71) Applicant: NIPPON LIGHT METAL COMPANY, LTD., Tokyo (JP)

(72) Inventors: Jie Xing, Shizuoka (JP); Hiroshi Kaneki, Shizuoka (JP); Ryo Yoshida, Shizuoka (JP); Yasuyuki Owada, Shizuoka (JP)

(73) Assignee: NIPPON LIGHT METAL COMPANY, LTD., Tokyo (JP)

(*) Notice: Subject to any disclaimer, the term of this patent is extended or adjusted under 35 U.S.C. 154(b) by 461 days.

(21) Appl. No.: 18/278,397

(22) PCT Filed: Dec. 15, 2021

(86) PCT No.: PCT/JP2021/046253
§ 371 (c)(1),
(2) Date: Aug. 22, 2023

(87) PCT Pub. No.: WO2022/180995
PCT Pub. Date: Sep. 1, 2022

(65) Prior Publication Data

US 2024/0141460 A1 May 2, 2024

(30) Foreign Application Priority Data

Feb. 24, 2021 (JP) ................................ 2021-027761

(51) Int. Cl.

| | |
|---|---|
| ***C22C 21/06*** | (2006.01) |
| ***B23K 26/21*** | (2014.01) |
| *B23K 103/10* | (2006.01) |

(52) U.S. Cl.
CPC .............. *C22C 21/06* (2013.01); *B23K 26/21* (2015.10); *B23K 2103/10* (2018.08)

(58) Field of Classification Search
CPC .... C22C 21/06; B23K 2103/10; B23K 26/24; B23K 26/21
See application file for complete search history.

(56) References Cited

U.S. PATENT DOCUMENTS

| | | | | |
|---|---|---|---|---|
| 8,852,365 B2 * | 10/2014 | Sankaran | ................ | C22C 21/06 148/698 |
| 2003/0145912 A1 * | 8/2003 | Haszler | .................. | C22C 21/06 420/541 |

(Continued)

FOREIGN PATENT DOCUMENTS

| | | |
|---|---|---|
| CN | 101233252 | 7/2008 |
| CN | 103361519 | 10/2013 |

(Continued)

OTHER PUBLICATIONS

Ozdemir, O., J. E. Gruzleski, and R. A. L. Drew. "Effect of low-levels of strontium on the oxidation behavior of selected molten aluminum-magnesium alloys." Oxidation of metals 72.5 (2009): 241-257.*

(Continued)

*Primary Examiner* — Jessee R Roe
(74) *Attorney, Agent, or Firm* — JCIPRNET

(57) ABSTRACT

A 5000-series aluminum alloy expanded material which does not undergo the occurrence of welding cracks even when the aluminum alloy expanded material is subjected to high-speed welding utilizing laser welding or the like; a welding-joined body comprising the aluminum alloy expanded material; and a method for efficiently welding the aluminum alloy expanded material. An aluminum alloy expanded material for welding use, which is characterized by having an Mg content of 0.2% by mass or more and less (Continued)

than 6.0% by mass, and containing a surface active element capable of reducing the surface tension of molten aluminum, in which the surface active element comprises at least one element selected from Sr, Ca, Sb, Li and Ba, and the content of the surface active element is 0.08 to 0.50% by mass inclusive.

10 Claims, 9 Drawing Sheets

(56) References Cited

U.S. PATENT DOCUMENTS

2004/0109787 A1 6/2004 Haszler et al.
2009/0226343 A1 9/2009 Telioui et al.

FOREIGN PATENT DOCUMENTS

JP H1161312 3/1999
JP 2002543289 12/2002
JP 2009504918 2/2009
JP 2016121385 7/2016

OTHER PUBLICATIONS

"Office Action of China Counterpart Application", issued on Apr. 14, 2025, with English translation thereof, p. 1-p. 17.

"Office Action of China Counterpart Application", issued on Aug. 25, 2025, with English translation thereof, p. 1-p. 16.

"International Search Report (Form PCT/ISA/210) of PCT/JP2021/046253", mailed on Mar. 15, 2022, with English translation thereof, pp. 1-4.

"Office Action of Taiwan Counterpart Application", issued on Nov. 5, 2025, with English translation thereof, p. 1-p. 12.

Zhang; Shilin et al., "Basic Knowledge of Aluminum and Aluminum Alloys", Concise Aluminum Alloy Handbook, Feb. 2001, with English translation thereof, pp. 1-7.

Wang; Zhongtang et al., "Principles of Materials Forming", Planning Textbooks for Mechanical Engineering and Related Disciplines in General Higher Education Institutions, Jul. 2019, with English translation thereof, pp. 1-7.

Kang; Ning et al.,"Electrolytic Aluminum Production", Recommended by the Department of Occupational Capacity Building, Ministry of Human Resources and Social Security Vocational Education and Training Planning Textbook for the Nonferrous Metals Industry, Sep. 2015, with English translation thereof, pp. 1-8.

An; Xun et al., "Aluminum and Aluminum Alloy Welding", Welding Technology Manual, Mar. 1999, with English translation thereof, pp. 1-7.

"Office Action of China Counterpart Application", issued on Jun. 25, 2025, with English translation thereof, p. 1-p. 16.

* cited by examiner

ALUMINUM ALLOY EXPANDED MATERIAL FOR WELDING USE, ALUMINUM ALLOY WELDING-JOINED BODY, AND METHOD FOR WELDING SAME

CROSS-REFERENCE TO RELATED APPLICATION

This application is a 371 application of the International PCT application serial no. PCT/JP2021/046253, filed on Dec. 15, 2021, which claims the priority benefit of Japan Patent Application No. 2021-027761, filed on Feb. 24, 2021. The entirety of each of the above-mentioned patent applications is hereby incorporated by reference herein and made a part of this specification.

TECHNICAL FIELD

The present invention relates to an aluminum alloy expanded material having excellent weldability, a welding-joined body containing the aluminum alloy expanded material, and a method for welding the aluminum alloy expanded material.

BACKGROUND ART

Since aluminum is lightweight and rust-resistant, and can be strengthened by adding appropriate elements, it is widely used in structures such as railway vehicles, ships, bridges, and various housings. Here, although aluminum has excellent processability, welding is essential for structuring.

However, it is known that aluminum generally has poor weldability compared to iron and the like, and cracks may occur due to solidification cracking or liquefaction cracking. Welding has been conventionally performed at a reduced welding speed, but the demand for improved productivity has increased year by year, and along with this, there has been a strong desire to improve the welding speed of aluminum.

On the other hand, for example, in Patent Literature 1 (Japanese Patent Unexamined Publication No. 2016-121385), for the purpose of providing an aluminum alloy sheet for case that can suppress cracks due to laser welding and a case by using the same, there is disclosed an aluminum alloy sheet for case excellent in laser weldability which has a chemical composition consisting of Si: 2.0% or more and 11.0% or less (% by mass, hereinafter the same), Fe: over 0% and 2.0% or less and the balance Al with inevitable impurities, has elongation of 8% or more, and has second phase particles containing Si and Fe in the Al matrix wherein equivalent circle diameter of the second phase particle is 17 μm or less.

In the case aluminum alloy sheet of Patent Literature 1, it is said that, since the case aluminum alloy sheet for case is made of an Al—Si based alloy having a lower melting point than the conventional 3000 series aluminum alloy or the like, the welding can be performed with lower output laser, and thus the molten amount of the aluminum alloy member during laser irradiation can be easily reduced. In addition, since the aluminum alloy sheet for case is made of the Al—Si based alloy, it has a smaller shrinking rate during the solidification than 3000 series aluminum alloys and the like. As a result of these, the aluminum alloy for case has lower cracking susceptibility than the 3000 series aluminum alloy and the like, and can suppress cracking after the laser welding.

CITATION LIST

Patent Literature

Patent Literature 1: Japanese Patent Unexamined Publication No. 2016-121385

SUMMARY OF THE INVENTION

Technical Problem

However, the aluminum alloy sheet for case of Patent Literature 1 is mainly composed of a 3000 series aluminum alloy, but since 3000 series aluminum alloy has many drawbacks such as lack strength and the like, it is strongly desired to realize an aluminum alloy material having both properties of excellent weldability and high mechanical strength. More specifically, it is expected to impart excellent weldability to a 5000 series aluminum alloy.

Further, the welding speed shown in Patent Literature 1 is 2 m/min, but, for example, in the laser welding, since a higher welding speed is often used, it is difficult to say that it is sufficient from the viewpoint of speeding up welding.

In view of the problems in the prior art as described above, the present invention provides a 5000 series aluminum alloy expanded material which does not undergo the occurrence of weld cracks even when subjected to high-speed welding by utilizing laser welding or the like, a welding-joined body comprising the aluminum alloy expanded material, and a method for efficiently welding the aluminum alloy expanded material.

Solution to Problem

The present inventors have made intensive research on the composition of aluminum alloys and the relationship between the composition and weld cracks, etc., and then the inventors have found that it is extremely effective that an appropriate amount of a surface-active element (at least one of Sr, Ca, Sb, Li and Ba) is added to an aluminum alloy to lower the surface tension of the molten aluminum alloy, and the like, and have reached the present invention.

That is, the present invention can provide an aluminum alloy expanded material for welding, which is characterized in that:

- a content of Mg is 0.2% by mass or more and less than 6.0% by mass,
- a surface-active element capable of reducing the surface tension of molten aluminum is contained,
- the surface-active element is at least one of Sr, Ca, Sb, Li and Ba, and
- a content of the surface-active element is 0.08% by mass or more to 0.50% by mass or less.

By containing the surface-active element (at least one of Sr, Ca, Sb, Li and Ba), the surface tension of the molten aluminum can be reduced, the fluidity of aluminum in the molten region is improved, and thus, the weld cracks can be suppressed even when high-speed joining is performed. Here, the surface-active element is preferably Sr. By adding Sr as the surface-active element, the surface tension of the molten aluminum can be lowered more simply and efficiently than when other elements are added.

Further, when welding an aluminum alloy that does not contain an appropriate amount of the surface-active element, the metal structure of the bead portion becomes a coarse columnar crystal structure, and the weld cracks are likely to occur therefrom. On the other hand, when 0.08% by mass or more of the surface-active element is added, the columnar structure of the bead portion is refined to suppress the weld cracking. The effect is not clearly improved even when 0.5% by mass or more of the surface-active element is added, and the raw material cost increases due to the addition of the surface-active element, and thus, the amount to be added is set to 0.5% by mass or less. Here, a more preferable addition amount range of the surface-active element is 0.10% by mass or more and 0.2% by mass or less.

Further, in the aluminum alloy expanded material for welding of the present invention, the content of Mg is 0.2% by mass or more and less than 6.0% by mass. By adding Mg in an amount of 0.2% by mass or more and less than 6.0% by mass, it is possible to increase strength by solid-solution strengthening or the like, while maintaining sufficient corrosion resistance.

Further, in the aluminum alloy expanded material for welding of the present invention, it is preferable that the composition other than the surface-active elements is within the range of the 5000 series aluminum alloys (Al—Mg series aluminum alloys) specified in JIS. The elements other than the surface-active element in the aluminum alloy expanded material for welding of the present invention may be elements generally added to the 5000 series aluminum alloys and within the composition ranges, and also impurities are acceptable within the range specified in JIS for the 5000 series aluminum alloys.

Further, the present invention also provides a welding-joined body formed by welding two or more members, wherein at least one of the members to be welded is the aluminum alloy expanded material for welding of the present invention. When at least one of the materials to be welded of the welding-joined body is the aluminum alloy expanded material for welding of the present invention, the welding-joined body can be efficiently manufactured by high-speed welding. Further, the occurrence of defects such as cracks is suppressed in the welded portion formed by high-speed welding, and the welding-joined body has high strength and reliability.

Furthermore, the present invention also provides a method for welding aluminum alloy materials, characterized by welding the aluminum alloy expanded material for welding of the present invention at a welding speed of 3 mm/min or more. In the method for welding the aluminum alloy material of the present invention, since the aluminum alloy expanded material for welding of the present invention is used as the material to be welded, even when the welding speed is set to 3 mm/min or more, the formation of the defects such as cracks is suppressed. From the viewpoint of productivity and suppression of defect formation in the welding zone, the welding speed is preferably 4 mm/min or more, more preferably 5 mm/min or more.

Further, in the method for welding aluminum alloy materials of the present invention, it is preferable that laser welding is used for the welding. When using the laser welding, the welding speed can be easily increased. Further, when performing the high-speed welding of 5 mm/min or more, for example, hybrid laser welding can be used. Hybrid laser welding is a welding technology that induces an arc to the cathode spot generated by the preceding laser to weld, it is possible to realize the improvement of the welding stability, the suppression of the defect formation, the increase in the welding speed, the increase in the penetration depth, and the like.

Effects of the Invention

According to the present invention, it is possible to provide a 5000-series aluminum alloy expanded material which does not undergo the occurrence of weld cracks even when the aluminum alloy expanded material is subjected to high-speed welding utilizing laser welding or the like, a welding-joined body comprising the aluminum alloy expanded material, and a method for efficiently welding the aluminum alloy expanded material.

EMBODIMENTS FOR ACHIEVING THE INVENTION

Figure 1:
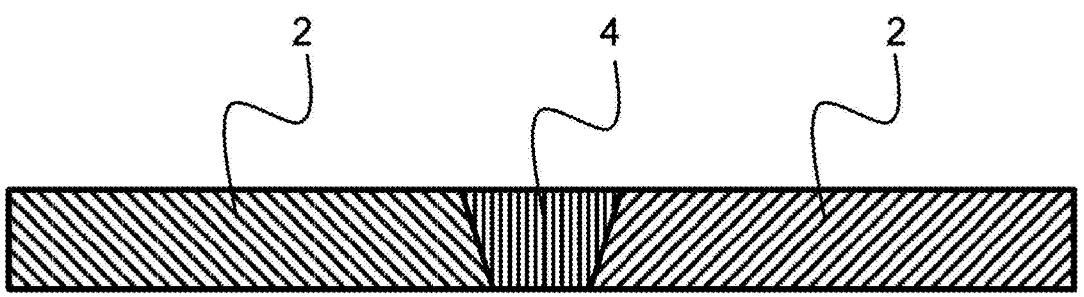
FIG. 1 is a schematic cross-sectional view of the vicinity of the welded portion in one embodiment of the aluminum alloy welding-joined body of the present invention.
Figure 1:

Hereinafter, representative embodiments of the aluminum alloy extended material for welding, the aluminum alloy welding-joined body, and the method for welding the material of the present invention will be described in detail with reference to the drawings, but the present invention is not limited to only these examples. In the following description, the same or corresponding parts are denoted by the same reference numerals, and redundant description may be omitted. Also, since the drawings are for the purpose of conceptually explaining the present invention, the dimensions and ratios of the depicted components may differ from the actual ones.

1. Aluminum Alloy Expanded Material for Welding

The aluminum alloy expanded material for welding of the present invention is characterized by containing Mg of 0.2% by mass or more and less than 6.0% by mass and the surface-active element of 0.08% by mass or more and 0.50% by mass or less. Each component will be described in detail below.

(1) Essential Additive Element

Mg: 0.2% by Mass or More and Less than 6.0% by Mass

Mg is a major additive element in the 5000 series magnesium alloys, and can increase the strength of aluminum through solid-solution strengthening. When containing Mg of 0.2% by mass or more and less than 6.0% by mass, the aluminum alloy expanded material for welding can be suitably used as a structural member that requires high strength and high reliability.

Surface-Active Element (at Least One of Sr, Ca, Sb, Li and Ba): 0.08% by Mass or More and 0.50% by Mass or Less By containing the surface-active element of 0.08 to 0.50% by mass, since the surface tension of the molten aluminum can be reduced, the fluidity of the molten aluminum is improved, and the weld cracks can be suppressed even when high-speed welding is performed at a welding speed exceeding 3 m/min. It is preferable to use Sr as the surface-active element.

Further, when welding an aluminum alloy that does not contain the surface-active element, the metal structure of the bead portion becomes a coarse columnar crystal structure, and the weld cracks are likely to occur therefrom. On the other hand, when 0.08% by mass or more of the surface-active element is added, the columnar structure of the bead portion is refined to suppress the weld cracking. The effect is not clearly improved even when 0.5% by mass or more of the surface-active element is added, and the raw material cost increases due to the addition of the surface-active element, and in addition thereto, when adding a large amount, there is possibility to form coarse compounds. In addition, when a large amount of the surface-active element is added, air is easy to be entrained during the high-speed welding, and blowholes are easy to be formed. From these points of view, the addition amount of the surface-active element is set to 0.5% by mass or less.

Here, more preferable range of the addition amount of the surface-active element is 0.10% by mass or more and 0.2% by mass or less, and the most preferable range of the addition amount of the surface-active element is 0.15% by mass or more and 0.2% by mass or less.

(2) Arbitrary Additive Elements

Additional elements other than Mg, which improves the mechanical properties of aluminum alloys, and the surface-active element, which improves weldability, are not particularly limited as long as the effects of the present invention are not impaired, and are ones within the range of the 5000 series aluminum alloy (Al—Mg series aluminum alloy) specified in JIS. That is, any additive element may be elements generally added to the 5000 series aluminum alloys and within the composition ranges, and also impurities are acceptable within the range specified in JIS for the 5000 series aluminum alloys.

2. Aluminum Alloy Welding-Joined Body

The aluminum alloy welding-joined body of the present invention is characterized by being formed by welding two or more members, wherein at least one of the members to be welded is the aluminum alloy expanded material for welding of the present invention. The case where Sr is added as the surface-active element will be described below. FIG. 1 shows a schematic cross-sectional view of the vicinity of the welded portion in one embodiment of the aluminum alloy welding-joined body of the present invention.

FIG. 1 shows a cross section perpendicular to the weld line, and an aluminum alloy welding-joined body 1 has a structure in which aluminum alloy materials 2 are joined together by a welded portion 4. Here, at least one of the aluminum alloy materials 2 is the aluminum alloy expanded material for welding of the present invention.

The shape and size of the welded portion 4 are not particularly limited as long as the effects of the present invention are not impaired, and may be appropriately adjusted according to the shape and size of the aluminum alloy material 2 and the desired joint characteristics. The welded portion 4 is preferably formed over the entire interface to be joined, but may be formed partially if the mechanical properties of the joint are not highly required.

Figure 2:
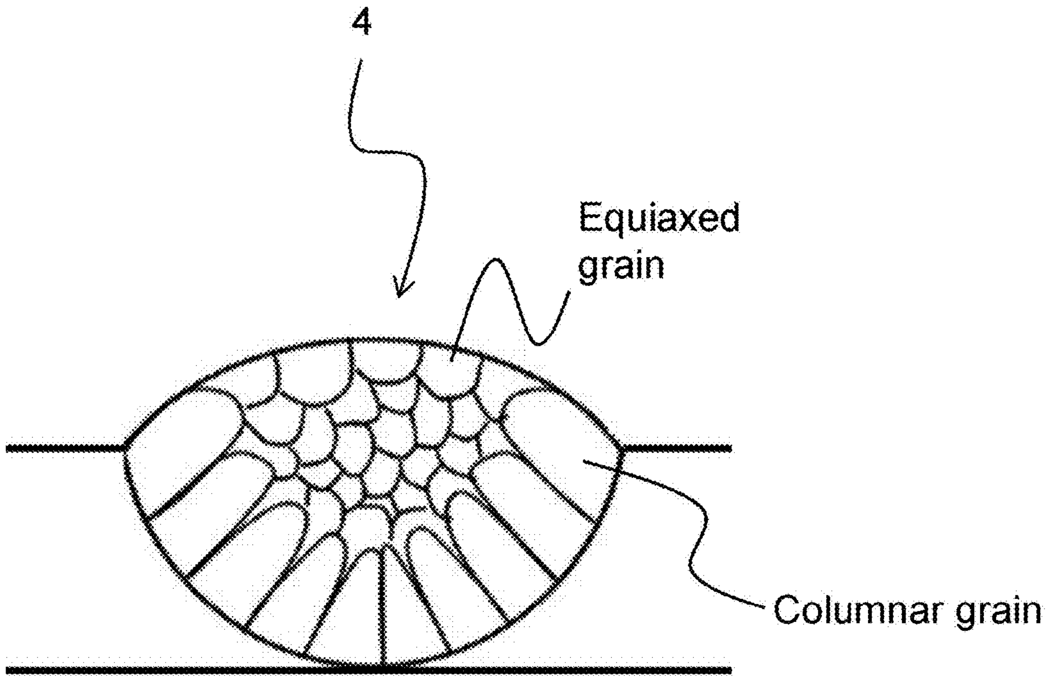
FIG. 2 is a schematic diagram of the microstructure of the welded portion 4.

FIG. 2 schematically shows the microstructure of the welded portion 4 in FIG. 1. The structure composed of the columnar crystals is formed in the solidifying direction from the boundary with the not-melted aluminum alloy material 2, and the structure composed of the equiaxed crystal grains is formed as the solidification progresses. Here, the structure of the welded portion 4 is refined by the addition of Sr, and both the columnar crystals and the equiaxed crystals are finer than the case where Sr is not added.

3. Method for Welding Aluminum Alloy Material (Method for Manufacturing Aluminum Alloy Welding-Joined Body)

With respect to the method for welding of aluminum alloy material of the present invention, the case where the aluminum alloy welding-joined body 1 is manufactured will be described as one example. The aluminum alloy welding-joined body 1 can be easily manufactured at a welding speed of 3 mm/min or more by using at least one or more members to be welded (aluminum alloy material 2) as the aluminum alloy expanded material for welding of the present invention.

Here, the effect of suppressing the formation of defects such as cracks in the welded portion is extremely remarkable, and the effect can be sufficiently obtained even when the welding speed is increased. From the viewpoint of productivity and suppression of defect formation in the welding zone, the welding speed is preferably 4 mm/min or more, more preferably 5 mm/min or more.

The method for welding is not particularly limited as long as the effects of the present invention are not impaired, and conventionally known welding methods can be used, and, for example, the high-speed welding can be performed easily by using the laser welding, and the high-speed welding can be performed more efficiently by using the hybrid laser welding.

Further, as long as the effects of the present invention are not impaired, a suitable filler material may be used as necessary, and the welding conditions other than the welding speed may be appropriately adjusted according to the plate thickness and shape of the materials to be joined.

Although representative embodiments of the present invention have been described above, the present invention is not limited to these, and various design changes are possible, and all such design changes are included in the technical scope of the present invention.

EXAMPLE

Example

Aluminum alloy expanded materials for welding (Example 1 and Example 2) having the compositions (% by mass) shown in Table 1 were obtained by adding Sr to the JIS-5050 aluminum alloy. The size and shape of the aluminum alloy expanded material for welding was a plate-like shape of length 200 mm×width 190 mm×thickness 3 mm.

TABLE 1

| | Si | Fe | Mg | Mn | Cr | Sr | Al |
|---|---|---|---|---|---|---|---|
| Ex. 1 | 0.08 | 0.17 | 1.41 | 0.09 | 0.07 | 0.110 | bal. |
| Ex. 2 | 0.08 | 0.19 | 1.41 | 0.08 | 0.08 | 0.170 | bal. |
| Com. Ex. 1 | 0.08 | 0.18 | 1.39 | 0.08 | 0.08 | — | bal. |
| Com. Ex. 2 | 0.09 | 0.18 | 1.41 | 0.08 | 0.08 | 0.055 | bal. |

Figure 3:
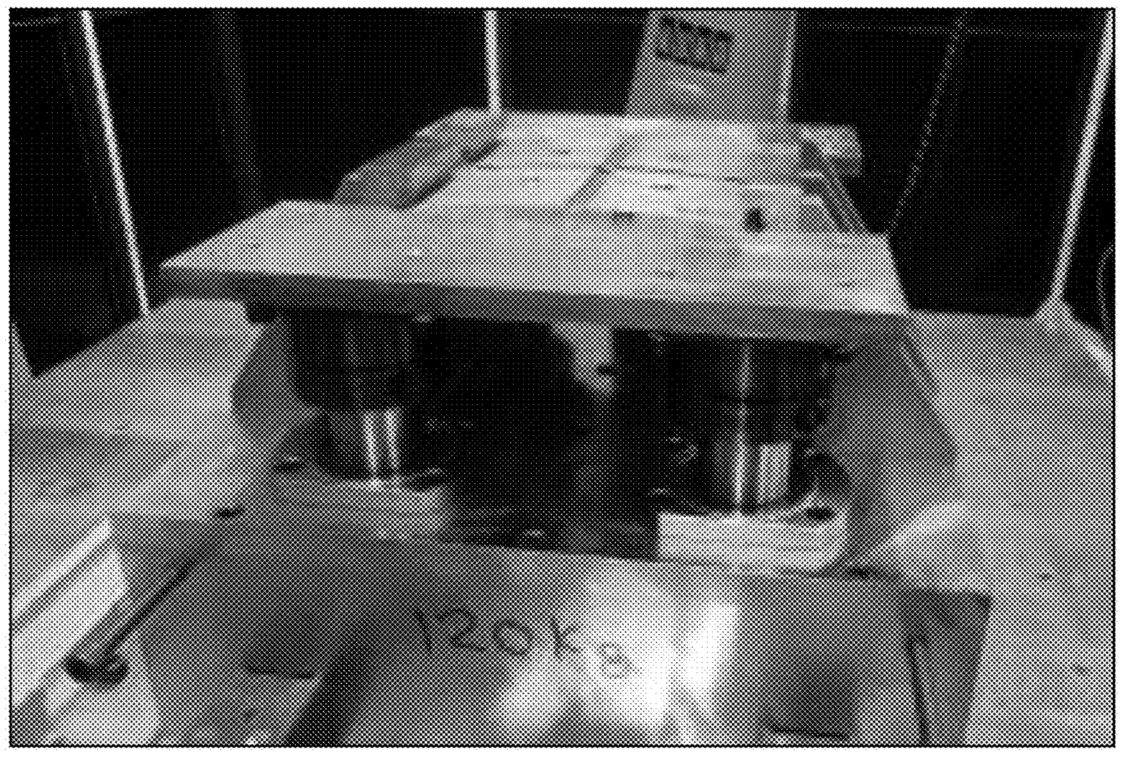
FIG. 3 is an appearance photograph of a jig for the Varestraint test.
Figure 4:
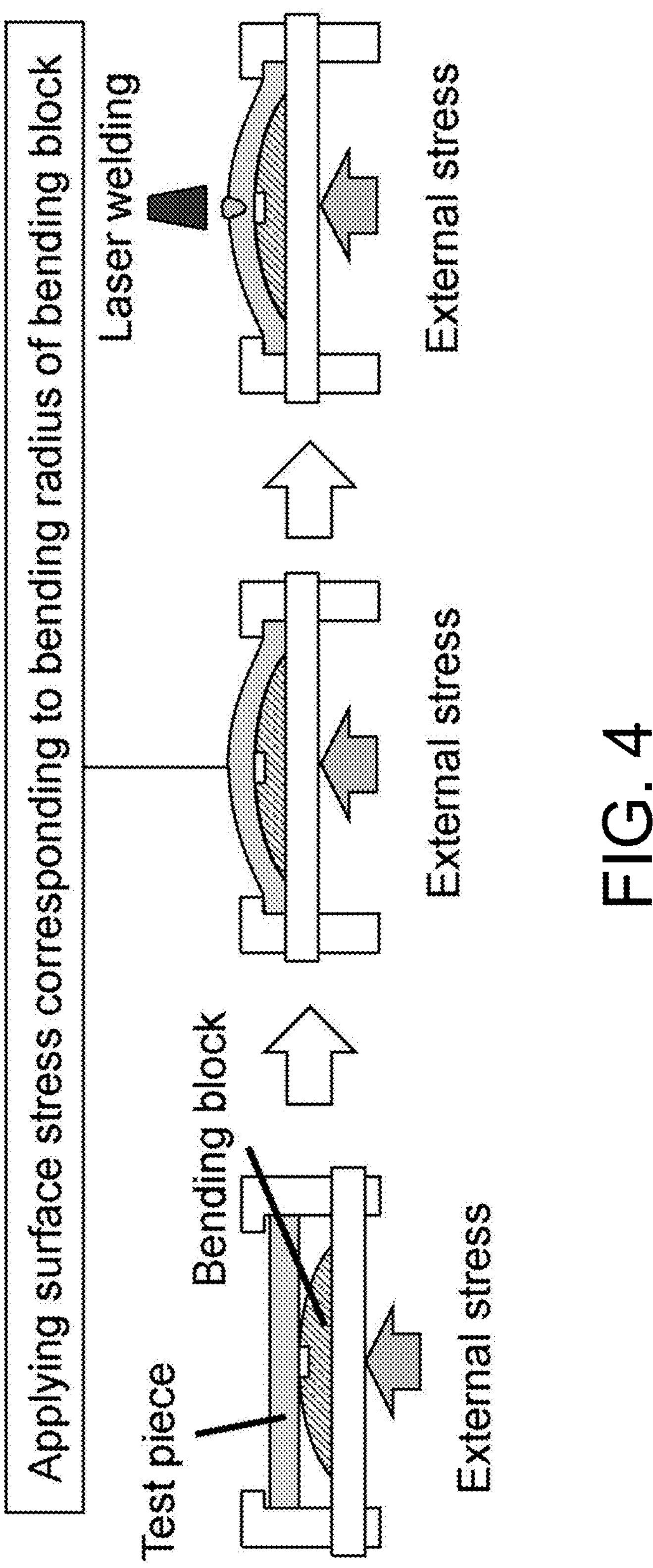
FIG. 4 is a schematic diagram of the Varestraint test.

Next, in order to evaluate the properties of the aluminum alloy expanded material for welding against the weld cracking, the welding was performed by the Varestraint test with the test jig shown in FIG. 3. A schematic diagram of the Varestraint test is shown in FIG. 4, in which the welding is performed while an external stress is applied to the materials to be joined, and the tensile stress applied to the welded portion promotes the weld cracking. The bending radius in the Varestraint test was 300 mm.

A multimode CW fiber laser available from IPG was used for the laser welding, and the laser welding was performed with a bead on at a laser output: 2600 W, an advance angle: 10°, an aim angle: 90°, and a welding speed: 5 m/min. In addition, the Varestraint test was performed three times for each aluminum alloy expanded material for welding.

Figure 5:
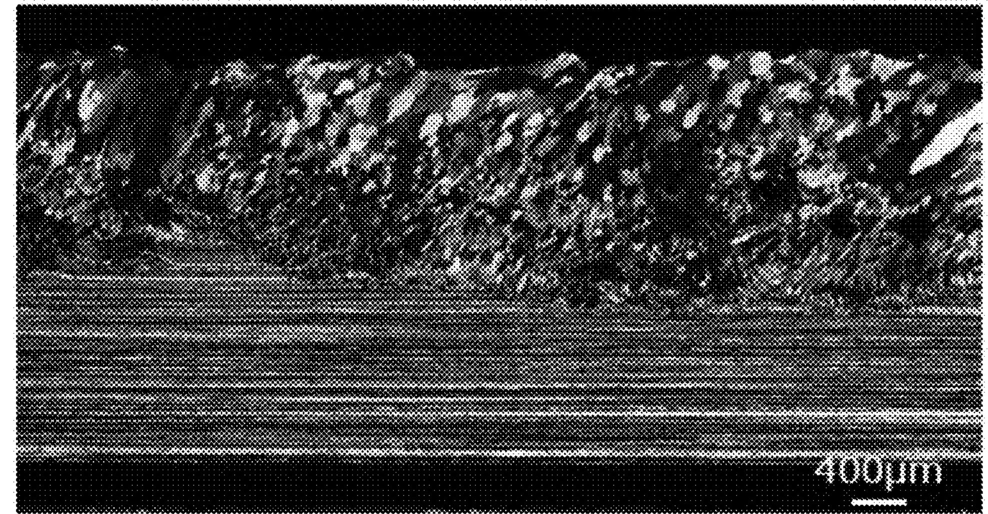
FIG. 5 is a photograph of the structure of the longitudinal cross-section of the welded portion obtained in Example 2.

As a typical example of the obtained expanded aluminum alloy expanded material for welding, the photograph of the structure of the longitudinal cross-section of the welded portion of the aluminum alloy expanded material obtained in Example 2 is shown in FIG. 5. The upper half of the longitudinal cross-sectional photograph is the welded portion (bead portion), and it can be seen that, in addition to the formation of the welded portion composed of the fine structure for both columnar and equiaxed crystals, the development of the columnar crystal structure is suppressed.

Figure 6:
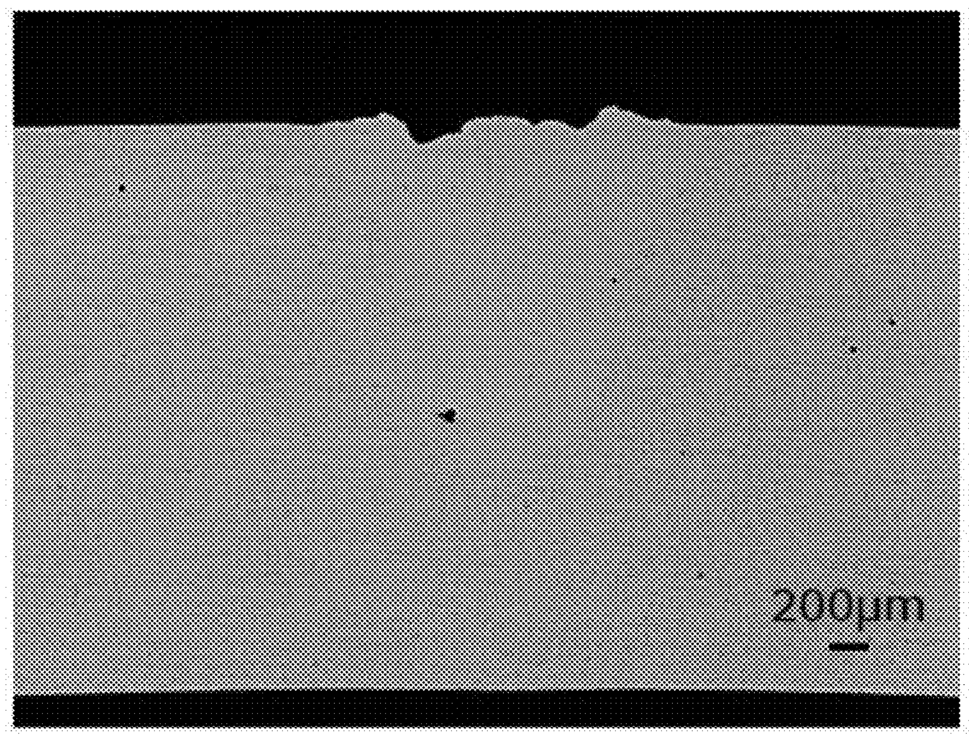
FIG. 6 is a macro photograph (without weld crack) of the cross-section of the welded portion obtained in Example 2.
Figure 7:
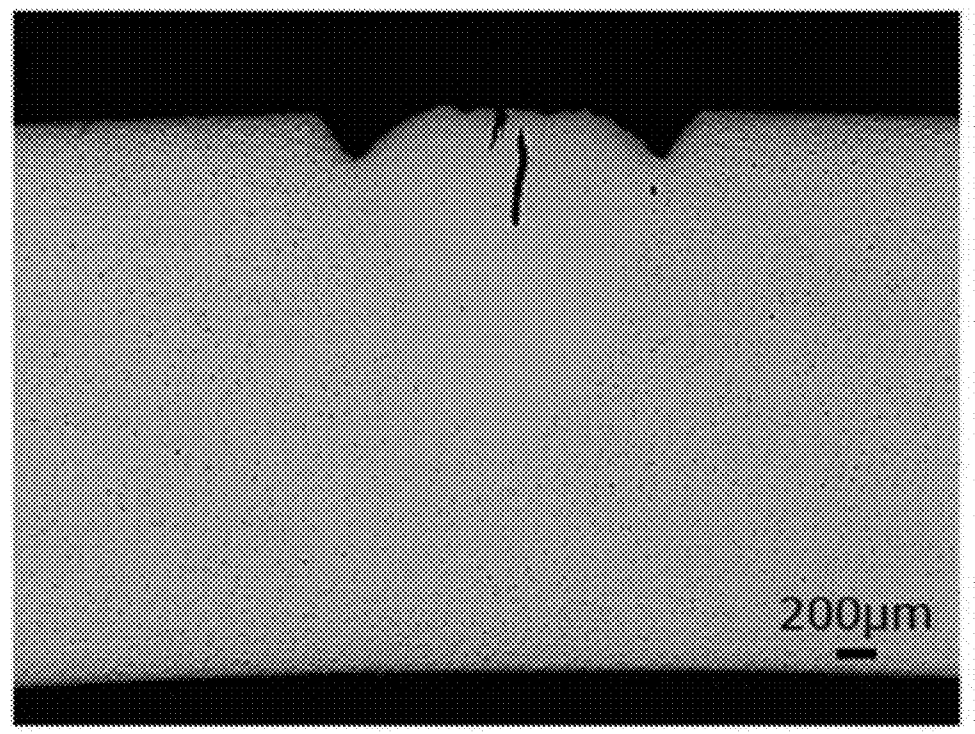
FIG. 7 is a macro photograph (with weld crack) of the longitudinal cross-section of the welded portion obtained in Example 2.

The typical macro photographs of the cross-section of the welded portion of the aluminum alloy expanded material obtained in Example 2 are shown in FIG. 6 and FIG. 7. No weld crack was observed in FIG. 6, and although the weld cracks were observed in FIG. 7, the cracks remained minute.

Comparative Example

Figure 8:
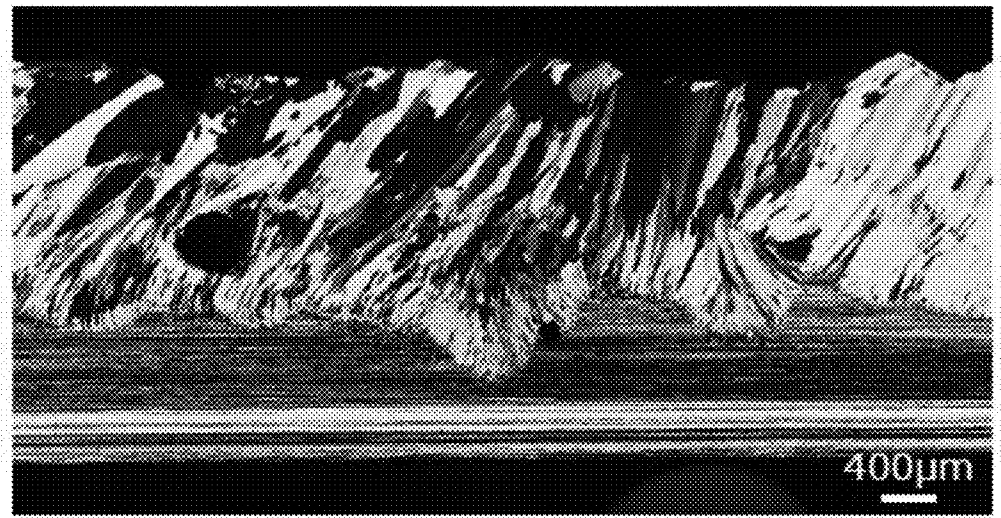
FIG. 8 is a photograph of the structure of the cross-section of the welded portion obtained in Comparative Example 1.

Welding was performed by the Varestraint test in the same manner as in Examples except that Sr was not added to the JIS-5050 aluminum alloy and the composition (% by mass) shown as the Comparative Examples in Table 1 was used. FIG. 8 shows a photograph of the structure of the cross-section of the welded portion obtained in Comparative Example 1. The upper half of the longitudinal cross-sectional photograph is the welded portion (bead portion), and both the columnar crystal and the equiaxed crystal are coarser than in the case of Examples. In addition, it can be seen that the structure composed of columnar crystals grows remarkably, and the structure is disadvantageous for suppressing the weld cracking.

Figure 9:
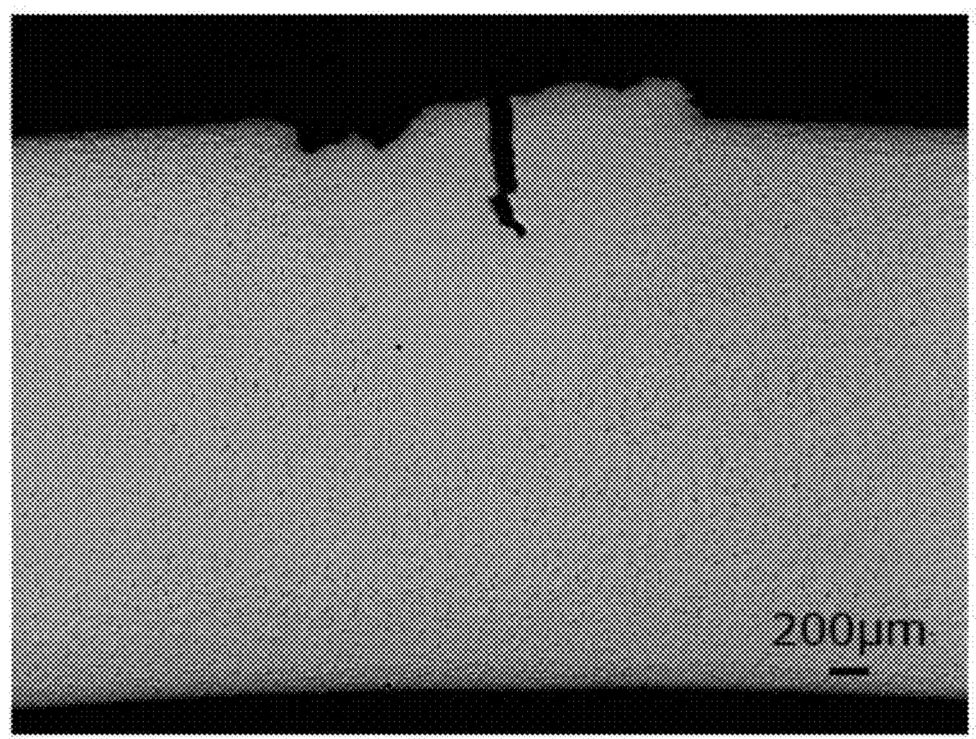
FIG. 9 is a macro photograph of the longitudinal cross-section of the welded portion obtained in Comparative Example 1.

FIG. 9 shows a macro photograph of the typical longitudinal cross-section of the welded portion of the aluminum alloy expanded material for welding obtained in Comparative Example 1. In FIG. 9, the coarse weld cracks are observed.

Figure 10:
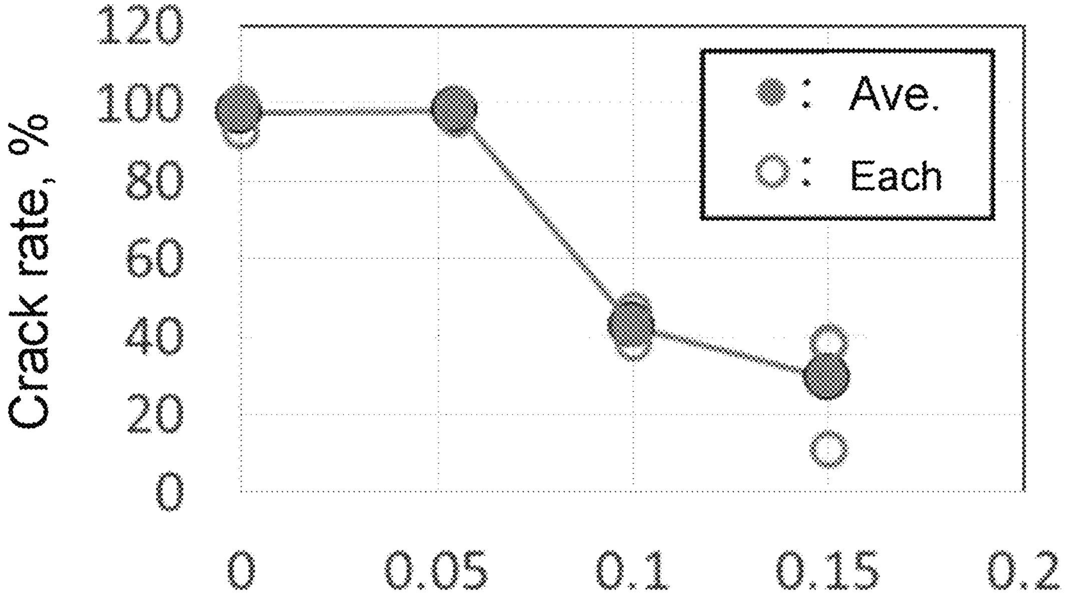
FIG. 10 is a graph which shows the relationship between the crack rate and the Sr amount in base material.

With respect to the weld cracks generated on the surface of the weld bead by the Varestraint test of Examples and Comparative Examples, the length of the weld cracks was measured by color check. Table 2 shows the length of the weld cracks obtained by the measurement as a ratio (crack rate) of crack length per 100 mm of the weld length. Further, FIG. 10 shows a graph which shows the relationship between the crack rate and the Sr amount in base material.

TABLE 2

| | Crack rate (%) | | | |
|---|---|---|---|---|
| | n = 1 | n = 2 | n = 3 | Ave. |
| Ex. 1 | 38.7 | 46.9 | 42.3 | 42.6 |
| Ex. 2 | 11.2 | 38.0 | 38.3 | 29.2 |
| Com. Ex. 1 | 100.3 | 99.2 | 92.7 | 97.4 |
| Com. Ex. 2 | 99.5 | 99.1 | 96.2 | 98.3 |

In Comparative Example 1 in which Sr was not added and Comparative Example 2 in which 0.055% by mass of Sr was added, the average crack rates are high values of 97.4% and 98.3%, respectively, but it can be seen that in Example 1 and Example 2 in which 0.1% by mass or more of Sr was added, the crack rates are significantly lowered.

The invention claimed is:

1. A welding-joined body formed by welding two or more members, wherein at least one of the members to be welded is an aluminum alloy expanded material for welding, and the aluminum alloy expanded material for welding comprises:

a content of Mg is 0.2% by mass or more and less than 6.0% by mass, a surface-active element capable of reducing the surface tension of molten aluminum is contained, the surface-active element is Sr, a content of the surface-active element is 0.08% by mass or more to 0.50% by mass or less, and a balance Al with inevitable impurities.

2. The welding-joined body according to claim 1, wherein the content of the surface-active element is 0.10% by mass or more to 0.20% by mass or less.

3. The welding-joined body according to claim 2, wherein the aluminum alloy expanded material for welding further comprises at least one selected from the group consisting of Si, Fe, Mn, and Cr.

4. A method for welding aluminum alloy materials, comprising:

welding the welding-joined body according to claim 2 at a welding speed of 3 mm/min or more.

5. The method for welding aluminum alloy materials at a high-speed welding according to claim 4, wherein the welding is a laser welding.

6. The welding-joined body according to claim 1, wherein the aluminum alloy expanded material for welding further comprises at least one selected from the group consisting of Si, Fe, Mn, and Cr.

7. A method for welding aluminum alloy materials, comprising:

welding the welding-joined body according to claim 6 at a welding speed of 3 mm/min or more.

8. The method for welding aluminum alloy materials at a high-speed welding according to claim 7, wherein the welding is a laser welding.

9. A method for welding aluminum alloy materials, comprising:

welding the welding-joined body according to claim 1 at a welding speed of 3 mm/min or more.

10. The method for welding aluminum alloy materials at a high-speed welding according to claim 9, wherein the welding is a laser welding.

* * * * *